Patented Feb. 7, 1950

2,497,057

UNITED STATES PATENT OFFICE 2,497,057

TOILET BOWL CLEANER

John W. Pape, Indian Hill, Ohio, and George S. Santmyers, Los Angeles, Calif.; said Santmyers assignor to said Pape No Drawing. Application April 12, 1947, Serial No. 740,994

2 Claims. (Cl. 252—142)

This invention relates to compositions adapted particularly to be used for cleaning toilet bowls.

Bowl cleaning compositions presently available consist essentially of granular sodium acid sulphate which is packed loosely in cans, from which the user pours the material in such amount as he considers to be sufficient for the purpose. This amount, in fact, is usually two or three times as much as would be required, and, for this reason, the product is uneconomical to use, despite its relatively low cost. A more important consideration is the fact that the chemical is slow to dissolve. Being substantially heavier than water, it sinks and accumulates in a pile at the bottom of the bowl. The water adjacent to this area soon becomes saturated and in doing so, loses capacity to dissolve more chemical. However, since the water in the bowl is quiescent, diffusion of the concentrated solution at the bottom towards the surface also takes place at a slow rate. Therefore, even excessive amounts of chemical which may have been introduced are still inadequate to provide, in a reasonable length of time, a sufficiently high concentration in the upper levels of the bowl for effective cleaning purposes. Frequently, as much as half or more of the cleanser originally introduced is flushed away and wasted.

Briefly, this invention contemplates a bowl cleaning composition predominantly of acidic nature, in tabletted or compressed form, the individual tablets being so proportioned as to weight or size, to provide an adequate quantity of chemical for effective cleaning without substantial excess, and these measured amounts of chemical, in tablet or wafer form, are of an effervescent nature, whereby gas is liberated concurrently with dissolution, so as mechanically to agitate the water and thereby effect rapid distribution of the acid over all the toilet bowl surfaces in contact with the water, including areas within the trap which are not usually accessible, even though a brush is used.

Otherwise expressed, the invention is predicated upon the concept of enabling the user conveniently to control dosage or consumption of the cleanser by preparing it in tablet, pellet or wafer form, and of accelerating distribution of the dissolved cleanser, to make its concentration uniformly effective throughout the volume of water into which it has been introduced, through the medium of gas ebullition derived from the tablet itself. The turbulence produced in the quiescent solution, by virtue of the liberation of gas from the product, contributes at least in part to the acidic cleansing action, and, additionally, is most effective for effecting prompt dissolving of a compressed tablet which otherwise might be slow or difficult to dissolve.

A typical composition of the present invention comprises sodium acid sulphate with which sodium bicarbonate has been incorporated to provide a source of effervescence. These chemicals, one producing a strong acid upon hydrolysis and the other producing a weak alkali, are intimately mixed with one another and are in intimate contact with one another in the product as received by the user. It is apparent, therefore, that the problem of producing such a product which will also remain stable against deterioration or decomposition over prolonged periods of storage awaiting use, is of considerable practical importance. However, it has been found that very satisfactory results may be obtained by the incorporation with these active components of a stabilizer which isolates them chemically one from another until they are released for reactivity when introduced in water. Thus, as the acidic component of the product, sodium or potassium acid sulphate, has been found to be suitable; the chemical effectiveness of such materials as toilet bowl cleansers already is well known. However, it is desirable that the anhydrous form be utilized, since the monohydrate compounds tend to melt in their own water of crystallization. Fused globular sodium acid sulphate is preferred, although the ground form may be used instead.

To provide the formation of a gas from within the tablet when it is dissolved in water, sodium bicarbonate is satisfactory since it is both cheap and effective. However, in place of sodium bicarbonate, other compounds may be utilized which are capable of reacting with the acid to produce a copious supply of gas such as, for example, other alkali metal carbonates, bicarbonates, acid reactive materials, or the like. Formation of gas, either carbon dioxide or otherwise, as caused by the reaction of acid and alkali compounds is well understood, and those skilled in the art will recognize a variety of materials which may be used for this purpose.

Stabilization conveniently is effected by coating both the particles of acid sulphate and gas generating composition so that in the dry state they are isolated chemically from one another. For this purpose, polyethylene glycol has been found to be very effective, and also inexpensive, since it is used only in small quantities. For best results in distributing the stabilizing agent over the surface of the particles, the stabilizer is dissolved in a suitable solvent, such as toluol, which subsequently is removed by evaporation from the particles after they have been coated. In the preferred procedure, the sodium acid sulphate and the gas generating composition, are separately mixed with the stabilizer and then the coated particles of the components are brought together for intermixture and subsequent compression.

In place of polyethylene glycol as stabilizer, sulfamic acid, azelaic acid, and, in general, products which are partially or freely soluble in water, substantially nondeliquescent, and inert to acids and alkalis, are satisfactory. The stabilizer may also display adhesive properties enabling it to serve additionally as a binder to facilitate compression of the particles. Otherwise, a binder such as starch, dextrin or the like may be employed.

Magnesium carbonate, activated alumina, or finely divided gypsum are representative of the class of additional components which also may be added to the mixture to prevent caking. In general, they are substantially chemically inert and therefore, serve no useful cleansing function; for this reason, they are desirably added only in small quantities.

It is to be recognized that whatever portion of the total amount of sodium acid sulphate is neutralized through interaction with the gas generating component, is just that much less sodium acid sulphate available for cleansing purposes upon dissolution of the tablet. For instance, for each percent of sodium bicarbonate present in the product, 1.43% sodium acid sulphate is consumed. Thus, a composition containing 25% sodium bicarbonate, 70% sodium acid sulphate and 5% of other ingredients would contain substantially 34.3% of sodium acid sulphate, free and useful for action as a cleanser. While the products of interaction of the components are a gas which is liberated and neutral sodium sulphate which is harmless, still this neutralizing action is to be taken into consideration in the formulation of the preparation, in order that gas ebullition will not be obtained at the expense of effective cleaning.

Our investigations have indicated that compositions containing approximately three to four times as much sodium acid sulphate as sodium bicarbonate provide a desirable balance between cleaning action and gas ebullition in tablets formed of a convenient size for distribution and for use without waste. Thus, for example, a typical composition may be as follows:

| | Per cent |
|---|---|
| Sodium acid sulphate | 71.0 |
| Sodium bicarbonate | 24.5 |
| Magnesium carbonate | 2.0 |
| Polyethylene glycol | 2.0 |
| Bactericide (if desirable) | .5 |

(All by weight.)

The polyethylene glycol referred to in this example is sold under the name Carbowax 1500 or Carbowax 4000 by Carbide & Carbon Chemicals Company. Carbowax 1500 is of an unctuous, butter-like consistence, while Carbowax 4000 is hard, more like paraffin. Either is suitable but the latter is preferred. Polyvinyl alcohol or methyl cellulose, both of which are soluble and possess marked adhesive properties, also may be used for the purpose in similar quantities.

In the preparation of this product, the stabilizer, such as Carbowax, is dissolved in toluol or other suitable anhydrous or substantially anhydrous solvent, for example, approximately 20 parts by weight of stabilizer to 80 parts of solvent, and this solution then is distributed over the particles of sodium acid sulphate and sodium bicarbonate, which preferably are treated in separate batches. Subsequently, the sodium acid sulphate is dried; for example, at a temperature of 105° C. for two to three hours after which the magnesium carbonate or anti-caking agent may be mixed in. The treated sodium bicarbonate need not be dried but is added to the treated and dried sodium acid sulphate while it is in apparently moist or damp condition. This procedure facilitates the preparation of firm and stable tablets. Any bactericide, such as calcium hypochlorite, copper sulphate or the like, which is to be added to the preparation, may be incorporated in the final mixing step.

The composition, when thoroughly mixed, is compressed under pressure of three to four tons per square inch to provide tablets approximately two inches in diameter by $\frac{1}{16}$ to $\frac{3}{8}$ inches thick which are firm and stable and which dissolve readily to produce acid concentrations in water having pronounced cleansing action, e. g., pH 1 to 2. Upon introduction of such tablets into water, decomposition and gas ebullition occurs from the surface inwardly as soon as the protective film of stabilizer is dissolved from the particles. This gas liberation facilitates rupture of the physical structure of the tablet whereby the process of dissolution is accelerated. As the gas bubbles move upwardly through the water, mechanical agitation akin to stirring, is provided which causes distribution of the dissolved chemical far more rapidly than would occur by natural diffusion. The rate of dissolution may be further accelerated by means of perforations in the tablets which also cause larger gas bubbles to be formed with commensurate increase in the degree of agitation of the water.

It should be borne in mind that germicides or bactericides employed for sanitary purposes should be used sparingly and with caution because of the possibility that they may interfere with the operation of septic tanks.

From the observations which have been made to date over prolonged storage periods, the compositions of the invention are stable against deterioration almost indefinitely whether or not special packing precautions are observed. Tablets allowed to remain in the open atmosphere show no appreciable deterioration over two-week periods of time; obviously, these conditions are more severe than are likely to be encountered during commercial distribution.

As a further variation, the invention contemplates the incorporation of foaming agents along with the gas liberating components, whereby a layer of acidic foam may be established above the water level of the toilet bowl to reach any ring at or just above the water line. In this manner, the use of a brush to cleanse the surface is minimized. Sellogen C, a sodium salt of the sulfo ester of secondary fatty alcohol is representative of a variety of low cost surface-active foaming agents which are available for this purpose; this product is manufactured by Jacques Wolf & Company, of Passaic, New Jersey. Its presence in amounts up to approximately .5% produces a thick lather when the tablets are dissolved in water and does not impair the stability of the product.

Having described our invention, we claim:

1. A tabletted composition for cleaning toilet bowls consisting essentially of sodium acid sulphate, a substantial but less than molecular equivalent amount of sodium bicarbonate effective when dissolved in water to liberate an amount of carbon dioxide sufficient to agitate the water in a toilet bowl and a normally solid polyethylene glycol sufficient in amount to prevent substantial reactivity in the tablet between sodium bicarbonate and sodium acid sulphate until the tablet is introduced into water.

2. A tabletted composition for cleaning toilet bowls consisting essentially of sodium acid sulphate, a substantial but less than molecular equivalent amount of sodium bicarbonate, effective when dissolved in water to liberate an amount of carbon dioxide sufficient to agitate the water in a toilet bowl, and a normally solid water soluble organic stabilizer which is non-reactive in respect to the sodium acid sulphate and sodium bicarbonate, said stabilizer being present as a surface coating on the particles of reactants, and being sufficient in amount to prevent reactivity in the tablet between the sodium bicarbonate and sodium acid sulphate until the tablet is introduced into water.

JOHN W. PAPE.
GEORGE S. SANTMYERS.

REFERENCES CITED

The following references are of record in the file of this patent:

UNITED STATES PATENTS

| Number | Name | Date |
|---|---|---|
| 980,936 | Federer | Jan. 10, 1911 |
| 1,450,865 | Pelc | Apr. 3, 1923 |
| 1,598,103 | Palmer | Aug. 31, 1926 |
| 2,222,830 | Moss | Nov. 26, 1940 |
| 2,228,483 | Raecke | Jan. 14, 1941 |
| 2,329,694 | Bodman | Sept. 21, 1943 |
| 2,359,243 | Pernert | Sept. 26, 1944 |
| 2,372,402 | Stokes | Mar. 27, 1945 |
| 2,387,244 | Compton et al. | Oct. 23, 1945 |
| 2,424,992 | Lee | Aug. 5, 1947 |

FOREIGN PATENTS

| Number | Country | Date |
|---|---|---|
| 5,502 | Australia | Jan. 11, 1927 |